US010831434B2

(12) United States Patent
Aldrian et al.

(10) Patent No.: US 10,831,434 B2
(45) Date of Patent: Nov. 10, 2020

(54) METHOD FOR GENERATING AND UPDATING A REMOTE INSTANCE OF A SCREEN VIEW

(71) Applicant: AVL LIST GmbH, Graz (AT)

(72) Inventors: Andreas Aldrian, Haseldorf-Tobelbad (AT); Peter Priller, Gratwein-Straßengel (AT)

(73) Assignee: AVL LIST GmbH, Graz (AT)

( * ) Notice: Subject to any disclaimer, the term of this patent is extended or adjusted under 35 U.S.C. 154(b) by 70 days.

(21) Appl. No.: 16/082,829

(22) PCT Filed: Feb. 21, 2017

(86) PCT No.: PCT/EP2017/053848
§ 371 (c)(1),
(2) Date: Sep. 6, 2018

(87) PCT Pub. No.: WO2017/153159
PCT Pub. Date: Sep. 14, 2017

(65) Prior Publication Data
US 2019/0095168 A1     Mar. 28, 2019

(30) Foreign Application Priority Data

Mar. 7, 2016 (AT) ................................. 50179/2016

(51) Int. Cl.
*G06F 3/14* (2006.01)
*H04L 29/06* (2006.01)
(Continued)

(52) U.S. Cl.
CPC .............. *G06F 3/1454* (2013.01); *G06F 3/14* (2013.01); *H04L 63/0428* (2013.01);
(Continued)

(58) Field of Classification Search
CPC .. G07F 17/3211; G06F 3/0481; G06F 3/1454; G06F 40/169; G06F 16/1734;
(Continued)

(56) References Cited

U.S. PATENT DOCUMENTS 7,062,502 B1 * 6/2006 Kesler ................... G06F 16/252
8,102,400 B1   1/2012 Cook et al.
(Continued)

FOREIGN PATENT DOCUMENTS

DE         10151117 A1   5/2003
DE    102009028051 A1   2/2011
(Continued)

OTHER PUBLICATIONS

Amer et al.: "Partial order transport service for mulitmedia applications: reliable service." In: 2nd International Symposium on High Performance Distributed Computing, 1993. Proceedings. Spokane, WA, USA 20-23. published Jul. 20, 1993, pp. 272-280.
(Continued)

*Primary Examiner* — Chirag R Patel
(74) *Attorney, Agent, or Firm* — Whitmyer IP Group LLC

(57) ABSTRACT

A method and apparatus for generating and updating a remote instance of a screen view for a communication device during a communication session. The screen view has a number of data elements that are presented on the screen view in accordance with a defined static or dynamic display schema. A display schema that at least partially corresponds to the display schema of the screen view is transmitted to the communication device at least a first time via a first communication path, the values of at least one of the data elements are transmitted to the communication device via a second communication path during the communication session, and the values of the data elements and the transmitted
(Continued)

display schema are combined by the communication device in order to display the remote instance.

14 Claims, 2 Drawing Sheets

(51) Int. Cl.
*H04L 29/08* (2006.01)
*H04W 4/70* (2018.01)
*G05B 19/418* (2006.01)

(52) U.S. Cl.
CPC ...... *H04L 65/1069* (2013.01); *H04L 65/1073* (2013.01); *H04L 67/12* (2013.01); *H04W 4/70* (2018.02); *G05B 19/4185* (2013.01); *G09G 2358/00* (2013.01)

(58) Field of Classification Search
CPC ...... G06F 16/178; G06F 16/27; G06F 16/275; G06F 40/14; H04L 51/04; H04L 65/403
See application file for complete search history.

(56) References Cited

U.S. PATENT DOCUMENTS

| | | | |
|---|---|---|---|
| 9,276,996 B2 | 3/2016 | Vetter et al. | |
| 9,363,134 B1* | 6/2016 | Goodspeed | H04L 43/10 |
| 2002/0169645 A1 | 11/2002 | Aronstam et al. | |
| 2006/0089541 A1 | 4/2006 | Braun et al. | |
| 2008/0273699 A1* | 11/2008 | Roth | H04L 12/1895 380/241 |
| 2010/0317420 A1* | 12/2010 | Hoffberg | G06Q 30/0207 463/1 |
| 2011/0258637 A1 | 10/2011 | Bezdicek et al. | |
| 2013/0246946 A1 | 9/2013 | Iwasaki | |
| 2015/0052447 A1* | 2/2015 | Ritesh | H04L 67/125 715/740 |
| 2015/0254463 A1 | 9/2015 | Ryhorchuk et al. | |
| 2016/0119379 A1* | 4/2016 | Nadkarni | H04L 63/20 726/1 |
| 2016/0299749 A1* | 10/2016 | Sharma | G06F 8/61 |
| 2017/0105677 A1* | 4/2017 | Lerner | A61B 5/6803 |
| 2017/0131959 A1 | 5/2017 | Di Federico et al. | |

FOREIGN PATENT DOCUMENTS

| | | |
|---|---|---|
| GB | 2323668 A | 9/1998 |
| WO | 2015155274 A1 | 10/2015 |

OTHER PUBLICATIONS

Anderson et al.: "Starlight: Interactive Link." In: 12th Annual Computer Security Applications Conference, 1996. San Diego, CA, USA, published: Dec. 9, 1996, pp. 55-63.

AT Search Report Application No. A50179/2016 Completed: Feb. 3, 2017 2 Pages.

International Search Report & Written Opinion Application No. PCT/EP2017/053848 Completed: Apr. 5, 2017; dated Apr. 18, 2017 17 Pages.

Lin et al.: "Performance evaluation of remote display access for mobile cloud computing." In: Computer Communication, vol. 72, published May 30, 2015, pp. 17-25.

Qiang et al.: "Awareware: an adaptation middleware for heterogeneous environments." In: IEEE International Conference on Communications, Paris, published, Jun. 20, 2004, pp. 20-24.

Translated International Search Report Application No. PCT/EP2017/053848 Completed: Apr. 5, 2017; dated Apr. 18, 2017 3 Pages.

Yu et al.: "Application mobility in pervasive computing: A survey." In: Pervasive and Mobile Computing, vol. 9., published Jul. 31, 2012, pp. 2-17 and 31.

European Search Report Application No. 17 706 247.8 dated Mar. 25, 2020 7 pages.

* cited by examiner

METHOD FOR GENERATING AND UPDATING A REMOTE INSTANCE OF A SCREEN VIEW

TECHNICAL FIELD

The present teaching relates to a method for generating and updating a remote instance of a screen view for a communication device during a communication session, wherein the screen view has a number of data elements that are presented on the screen view in accordance with a defined static or dynamic display schema. Further, the present teaching relates to an apparatus for making available a remote instance of a screen view for display on a communication device, wherein a computer unit on which the screen view is displayed has at least one first communication path and at least one second communication path to the communication device, and wherein the screen view has a number of data elements that are presented on the screen view in accordance with a defined static or dynamic display schema. Finally, the present teaching relates to a software product which can be executed by a communication device for displaying a remote instance of a screen view displayed on a remote computer unit, wherein the communication device is connected to the computer unit via at least one first communication path and at least one second communication path.

BACKGROUND

With numerous online collaboration tools, it is possible, for example, to "share" the particular screen content in real time with one or more communication partner(s), wherein an image presentation of the screen view is produced, transmitted to the communication partner's computer via a network, in general the Internet, and this image presentation presented on a screen as a remote instance.

However, these online collaboration tools have the disadvantage that the whole screen content is always transmitted to all communication partners, even when this screen content displays sensitive data which are not intended for this communication partner. Furthermore, it is generally impossible for the communication partner to evaluate the data further with the support of a computer, as the image presentation does not allow such a data evaluation.

These and further disadvantages of the present teaching are avoided by means of a method of the kind described in the introduction, in which a display schema that at least partially corresponds to the display schema of the screen view is transmitted to the communication device at least a first time via at least one first communication path, wherein the values of at least one of the data elements are transmitted to the communication device via at least one second communication path during the communication session, and wherein the transmitted values of the data elements and the transmitted display schema are combined by the communication device in order to display the remote instance. This allows the data to be protected separately from the display schema during transmission particularly against misuse. Further, it is possible, depending on the communication partner, to release only a certain sub-group of data elements for transmission without this communication partner receiving information relating to other sensitive data.

SUMMARY

In conjunction with the present description, a "communication path" is defined by fixed end points, by the transmission protocol used, by a defined encryption and, if appropriate, by one or more defined intermediate stations. Two communication paths are different when one or both end points of the communication path differ and/or when the presence and, if appropriate, the number of defined intermediate stations differ between the communication paths, and/or when different transmission protocols are used in the communication paths, and/or when different encryptions are used in the communication paths.

In general, according to the present teaching, a first communication path and a second communication path, which differ from one another, are defined. However, as is clear to the person skilled in the art, a plurality of first and/or a plurality of second communication paths can also be defined. The important thing is the separate transmission of the display schema via the first communication path(s) and the data elements via the different second communication path(s).

The display schema that at least partially corresponds to the display schema of the screen view can be transmitted to the communication device either at the beginning of each communication session and then maintained unchanged during the communication session, or on the other hand, the display schema can be retransmitted at defined, regular or irregular intervals in order to match the display of the remote instance to changes in the screen view.

In conjunction with the present application, "screen view" is understood to mean the original of a screen presentation which is presented on a display of an associated computer unit during operation (including all data and image elements contained therein).

A screen presentation, which is displayed visibly for a communication partner on a remote device (which is generally referred to herein as "communication device") and which at least partially corresponds to the screen view or which can be looked upon as a remote copy of the screen view, is referred to as a "remote instance" of this screen view. The expression "at least partially corresponds to" can mean, in particular, that at least parts of the image and/or data elements are hidden, changed or replaced in the remote instance compared with the screen view.

In conjunction with the present application, an apparatus or instance is seen as being "remote" when it is connected to the computer unit on which the screen view is presented via a local network or a wide area network, in particular the Internet.

In conjunction with the present description, a definition of the arrangement of data and image elements on a screen view is referred to as a display schema. A remote instance of the original screen view can be produced with the help of the display schema, the image elements encountered therein and the values of the data elements.

In general, elements to which a particular static or variable value can be assigned are referred to as "data elements". For example, the output of a particular sensor (e.g. a temperature, a pressure, an acceleration, a speed etc.) can be defined as a data element, wherein the value of this data element always corresponds to the current measured value of this sensor (that is to say, for example, a value specified in C°, Pa, $m/s^2$, m/2, etc.).

All pictorially presented parts of the screen view are referred to as "image elements", wherein, depending on the definition, the image elements can either be part of the display schema and transmitted therewith, or, when the image element represents a pictorial presentation of data, they can also be defined as data elements.

In general, any apparatus which allows a presentation of the remote instance of the screen view can be looked upon as a communication device. In particular, a conventional personal computer which is connected to the Internet can be used as a communication device.

In an advantageous embodiment of the method according to the present teaching, communication according to the second communication path can take place via a broker and be executed in accordance with a protocol which functions in accordance with a subscriber/publisher model. By this means, on the one hand, the (sensitive) data transmission can be designed particularly securely and, on the other, the network connection by means of which the data are transmitted, can be completely blocked against incoming traffic and web services, which defeats hacker attacks.

The term "protocol which functions in accordance with a subscriber/publisher model" is understood to mean communication protocols in which the data is transmitted from a sender (which is referred to as the "publisher") to one or more receiver(s) (which are referred to as "subscribers") via a so-called "broker". The best-known example of such a protocol is the MQTT protocol. Here, the data are transmitted from the publisher to the broker, which stores these data in a channel in accordance with the protocol specifications. A subscriber of this channel can then call up the data from the broker without ever having to set up a direct connection between publisher and subscriber. As sender and receiver alternately act as publisher and/or subscriber, two-way communications can also be realized by means of this protocol.

To prevent data being called up by a non-authorized subscriber who has obtained knowledge of the channel information, these data can be encrypted in advance by the publisher for the authorized subscriber, for example by means of a conventional asymmetrical encryption method. The regular or irregular intervals at which the channel is accessed by the publisher and/or subscriber can be defined in accordance with the respective requirements.

The important thing with a protocol which functions in accordance with a subscriber/publisher model is that every connection is initiated from the "inside", that is to say from the safe environment, to the "outside", that is to say to the potentially insecure connection. It is therefore unnecessary to allow access to a safe environment from the outside, which is required in the case of web services with the help of an open port for example. This enables very safe firewall guidelines to be implemented, with which all ports are closed. However, communication by means of the protocol which functions in accordance with a subscriber/publisher model is still possible.

In an advantageous manner, the screen view can be a display of a computer unit which serves to control an installation of a user. Apparatuses for controlling installations require high safety precautions, which can be achieved and improved with the present teaching. The installation can be a test rig or a factory, for example.

In an advantageous embodiment, at least one data element can represent data of the telemetry level, such as measured data from measuring sensors of the installation for example. The user can himself define who gets to see which data values of the installation in the course of a communication session and in which form (i.e. with which display schema).

In order to further increase security, according to a further advantageous embodiment, the data transmission according to the second communication path can be encrypted.

The apparatus according to the present teaching of the kind mentioned in the introduction is characterized in that the computer unit transmits a display schema that at least partially corresponds to the display schema of the screen view to the communication device at least a first time via the first communication path, and wherein the values of at least one of the data elements are transmitted to the communication device via the second communication path during a communication session, thus enabling the method according to the present teaching to be executed advantageously.

In doing so, the computer unit can advantageously access the first communication path via a network interface and access the second communication path via a security controller. As a result, the security controller can be equipped with special security features, which also enables a demarcation of the installation region hardware against less secure hardware regions.

A particularly advantageously usable security controller, which can be traced back to the same applicant as the present application, is disclosed in the publication WO2015/155274A1. It is assumed that the person skilled in the art has extensive knowledge from this publication.

Here, the security controller can execute the communication via the second communication path according to a protocol which functions in accordance with a subscriber/publisher model.

In an advantageous manner, the second communication path can feed from the security controller via a broker. The broker can be made available by the provider of the communication solution, wherein, at the same time, the provider can ensure control via the security functionality but has no access to the communicated data.

In an advantageous manner, the security controller can have an encryption and decryption unit for this purpose.

In a further advantageous embodiment, the apparatus can produce a plurality of instances of the data elements, which, depending on the authorizations of a communication device, are transmitted selectively to this communication device. By this means, the data can be communicated with a different exactitude depending on the authorization which is assigned to a particular communication device. When a plurality of remote instances of the screen view are to be simultaneously displayed to a plurality of communication devices in a communication session, in each case, only that information which is defined for the particular communication partner is displayed. In practice, the provision of the different instances of the data elements can take place via separate channels in the broker which administers the subscriber/publisher model. The different instances can, for example, present the data in full resolution, in reduced resolution, or only as binary information (e.g. "Value in valid range—Yes/No"). If a communication partner does not have authorization for a data element, then no value for this data element is displayed in the instance. At the same time, pictorial presentations can also be defined as data elements, wherein the appropriate authorization defines whether and which pictorial presentation is displayed in the remote instance of the respective communication partner.

The software product mentioned in the introduction advantageously enables the communication device to execute at least the following steps: Reception of a display schema that at least partially corresponds to the display schema of the screen view via the first communication path; reception of values of at least one of the data elements via the second communication path during a communication session; combination of the received display schema and received values of the data elements to form the remote instance of the screen view; and display of the remote instance. The software product can be used on numerous communication devices of different communication partners, wherein the user of the computer unit which presents the screen view can define exactly what is generated and displayed by the software product as a remote instance. The display schema can also be defined and specified statically, wherein only the information relating to the display schema to be used is transmitted via the first communication path. Here, the display schema can also be defined in the software product.

In an advantageous manner, the software product can further enable the communication device to transmit data values to the remote computer unit via the second communication path. This enables a kind of "reverse channel" to be effected, via which the user of the communication device can undertake control actions at the computer unit on which the screen view is presented, for example in order to carry out parameter changes and control operations. The authorization for this can, if necessary, be released, blocked or released within certain limits for particular data elements by the user of the computer unit.

In doing so, the data values can advantageously be entered by a user via a user interface of the communication device. In this way, the remote instance can be used (within the framework of the respective authorizations) by the user, in a similar way to that which would take place at the computer unit which displays the screen view.

BRIEF DESCRIPTION OF THE DRAWINGS

The present teaching is explained in more detail below with reference to FIG. 1, which shows advantageous embodiments of the present teaching in an exemplary, schematic and non-restricting form. In the drawing.

DETAILED DESCRIPTION

Figure 1:
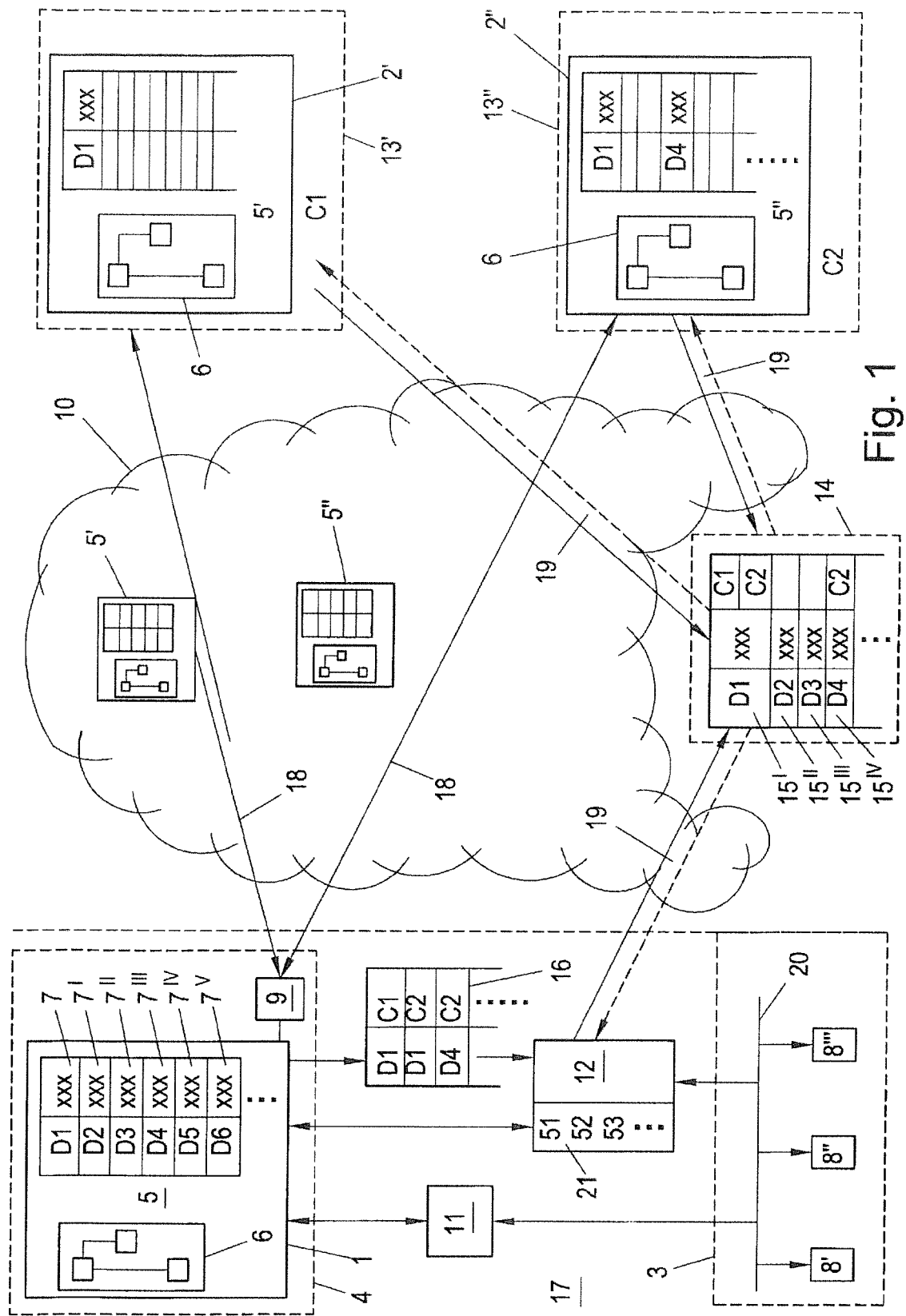
FIG. 1 shows a schematic overview of the units and communication paths involved in the method according to the present teaching.

The area separated by a dashed line on the left-hand side in FIG. 1 is associated with a user 17, wherein the user operates an installation 3 by means of a computer unit 4 which serves as control unit for the installation 3. The installation 3 can, for example, be a test rig, a machine or other industrial installation which can be operated, parameterized and/or monitored via the computer unit 4.

The installation 3 has a multiplicity of installation components $8^I$, $8^{II}$, $8^{III}$, wherein the installation components can, for example, represent actuators, measuring units or generally any components which generate and forward data to the computer unit 4, and/or can receive data from the computer unit 4. Communication between the computer unit 4 and the installation components 8 can, for example, take place via a bus connection 20.

The computer unit 4 has a screen view 1, on which a multiplicity of data elements D1, D2, etc. can be displayed according to a defined display schema 5. The display schema 5 can take any form and, for example, have dynamic or static image elements 6, wherein the display schema 5 assigns a particular display position $7^I$ to $7^V$ to each of the data elements D1, D2.

The data elements D1, D2, etc. can represent any presentable values which are of interest for the computer unit 4 or the installation 3, for example variable or pre-specified parameter data, simulation data and/or data of the telemetry level, such as measured data from installation measuring sensors etc.

The computer unit 4 has a network interface 9, by means of which communication via an open network 10 can take place. The open network 10 is preferably the Internet but can also be a different network which, for example, is only open to a defined circle of communication partners, provided that communication via and access to this network does not lie within the exclusive range of influence of one of the communication partners. The network interface 9 generally has security devices, such as a firewall structure for example, which prevent unauthorized data access by third parties via the open network 10.

Communication between the computer unit 4 and the installation components 8 can take place, for example, via a low-level interface 11, which can likewise have security mechanisms in order to prevent improper access to the installation components 8.

In addition, a security controller 12, the principle of operation of which is described in more detail below, is provided in the region of the user 17. The security controller 12 has data interfaces to the installation components 8 and to the computer unit 4, and it also has an interface to the open network 10, wherein this interface can, if necessary, completely block an incoming communication (for example by closing or deactivating all ports).

From the point of view of the user 17, there may be an interest in making the content of the screen view 1 visible on one or more communication devices $13^I$, $13^{II}$ as a remote instance 2 of the screen view 1 in real time, for example in order to discuss and rectify problems or malfunctions of one of the installation components 8 with a provider or service technician.

Basically, numerous online collaboration tools are available for this purpose, with which it is possible, for example, to "share" the particular screen content in real time, wherein an image presentation of the screen view is produced, transmitted to the communication device 13 via the open network 10, and this image presentation presented on a screen of the communication device 13 as a remote instance 2 in an animated or static manner.

However, these online collaboration tools have the disadvantage that the whole screen content is always transmitted to all communication devices 13, even when this screen content displays sensitive data which are not intended for this communication partner. Furthermore, it is generally impossible for the communication device to evaluate the data further, as the image presentation does not allow such a data evaluation.

Two different communication devices $13^I$ and $13^{II}$, on the screens of which a further instance $2^I$, $2^{II}$ respectively of the screen view 1 is presented, are shown by way of example in FIG. 1. The further instances $2^I$, $2^{II}$ are respectively based on a dynamic or static display schema $5^I$, $5^{II}$, which, like the screen view 1, can also have dynamic or static image elements 6 and assign a particular display position $7^I$ to $7^V$ to each data element D1, D2, etc.

The display schemata $5^I$, $5^{II}$ of the further instances $2^I$, $2^{II}$ can correspond to the display schema 5 of the screen view 1; however, they can also differ therefrom. Further, the display schemata $5^I$, $5^{II}$ of the further instances $2^I$, $2^{II}$ can be defined in the hardware or software of the communication devices $13^I$ and $13^{II}$ or they can be transmitted at the beginning or during a communication session from the computer unit 4 via a first communication path 18 to the communication device $13^I$ and $13^{II}$ and processed by the hardware or software therein for displaying as a further instance $2^I$, $2^{II}$. Depending on requirements, a new display schema $5^I$, $5^{II}$ can be transmitted every time the screen view 1 changes, or it can be transmitted at regular intervals in order, for example, to match the remote instances $2^I$, $2^{II}$ continuously and in real time to the current screen view 1.

Further, it is possible to make different display schemata $5^I$, $5^{II}$ available for different communication devices $13^I$ and $13^{II}$, for example when one of the communication devices $13^I$ and $13^{II}$ is only to receive restricted information relating to the image display 1, wherein, for example, certain image elements 6 or certain display positions 7 are not to appear in the remote instance $2^I$, $2^{II}$.

However, the display schemata $5^I$, $5^{II}$ do not contain any information relating to the current value of the data elements D1, D2, etc. but merely define their display position and form. The display schemata $5^I$, $5^{II}$ therefore merely represent an "empty shell" which must still be supplemented by the current values of the data elements D1, D2, etc.

The display schema $5^I$, $5^{II}$ is transmitted from the computer unit 4 to the communication device 13 via a first communication path 18, wherein a conventional Internet connection, for example, can be used for this first communication path 18; in FIG. 1, this constitutes a connection from the computer unit 4, via the network interface 9 and via the open network 10 to the communication devices 13.

In order to give the user 17 the option of defining exactly which data elements are to be displayable in which form for which communication device $13^I$ and $13^{II}$, and in order to protect the values of these data elements against unauthorized access by third parties, a dedicated transmission path, which differs from the transmission path with which the display schemata $5^I$, $5^{II}$ are transmitted, is chosen for communicating the values of the data elements.

In FIG. 1, the values of the data elements D1, D2, etc. are transmitted by the security controller 12 to a broker 14. In doing so, the security controller 12 uses a protocol which functions in accordance with a subscriber/publisher model. Such protocols, for example according to the MQTT specification, enable the security controller 12 to implement firewall guidelines which completely block incoming traffic. By this means, a manipulation of the system by web services and a setting-up of an end-to-end connection to the computer unit 4 or to the installation components 8 can be ruled out.

In the case of protocols which function in accordance with a subscriber/publisher model, it is known that no direct end-to-end connection is set up and the communication is always effected via the interposed broker 14. In general, the broker 14 receives data from a "publisher" and makes it available to one or more "subscribers". In doing so, a certificate-supported identification of publisher and/or subscriber is also supported and can be used advantageously in conjunction with the present teaching. Each end point (i.e. in the case shown in FIG. 1, the security controller 12 and the network interfaces of the communication devices $13^I$ and $13^{II}$) "opens" the communication to the broker 14 in its own right and this is not initiated "from the outside". When an end point acts as publisher, data are transmitted from this end point to the broker 14, and when an end point acts as subscriber, data are called up to the end point by the broker 14. As the communication devices 13 and also the security controller 12 can act both as subscriber and as publisher, it is also possible to exchange data in both directions without having to set up a potentially vulnerable web service for this purpose.

In FIG. 1, data communications from a publisher to the broker are shown by continuous arrows; subscriber operations, in which data are called up by a subscriber from the broker 14 from a channel 15, are shown as dashed arrows.

The broker 14 in each case assigns the data elements D to a channel 15 and makes the values for these data elements D received from a publisher available in this channel for calling up by one or more subscribers. Four channels $15^I$ to $15^{IV}$, to which a data element D1, D2, D3, D4 respectively is assigned, are shown by way of example in FIG. 1.

To ensure that not everyone who knows the broker 14 and the corresponding channels 15 can call up the values of the data D stored in this channel, these are encrypted by the security controller 12 with a specific key S1, S2, etc. for each of the data D1, D2, etc. They therefore cannot be read out either by third parties or by the broker 14 itself. For this purpose, the security controller 12 has an encryption and decryption unit 21, which preferably can be implemented hardware-coded on a chip in order to prevent unauthorized access and manipulation by third parties.

A decryption of the data stored in the channels must only be possible by the communication devices 13 which have authorization to do so. These authorizations can be assigned by the user 17 in any way, wherein the authorizations are communicated to the security controller 12 in the form of an assignment table 16. This assignment table 16 assigns data elements D to one or more communication devices 13 which is/are authorized to display this data element D. The specific assignment can take place, for example, by means of an asymmetrical key C1, C2, wherein each asymmetrical key C is assigned to a particular communication device 13.

For example, to release the data element D1 for the communication device $13^{II}$ to which the asymmetrical key C2 is assigned, the security controller 12 encrypts the symmetrical key S1 with which the data element D1 has been encrypted and transmits this key S1 encrypted to the communication device $13^{II}$, wherein this transmission is preferably also handled by the broker 14 with the help of the MQTT protocol. The communication device $13^{II}$ can now decrypt the symmetrical key S1 with the help of its asymmetrical key C2 and thus decrypt the values associated with the data element D1 which have been called up from the channel $15^I$ in encrypted form.

The values which can be encrypted by the communication device 13 are then inserted by the hardware and software running on this communication device into the display schema at the appropriate point and, as a result, the remote instance $2^I$, $2^{II}$ of the screen view is specifically updated for the particular communication device 13.

In FIG. 1, in which, for clarity, the number of data elements D, keys S, C and communication devices 13 has been greatly restricted compared with the possible number, the first communication device $13^I$ can, for example, only display the value of the first data element D1. On the other hand, the second communication device $13^{II}$ can display the values of data element D1 and D4. None of the other values are presented in the remote instance $2^{II}$.

In a practical example, the broker 14 could be made available by a manufacturer of certain installation components 8, for example. (This manufacturer can also provide the security controller 12). By this means, the manufacturer can provide his customer (i.e. the user 17) with an option of himself defining exactly who is to see which data of the installation components 8. Not even the manufacturer who operates the broker 14 can himself access these data unless he is authorized to do so by the user 17. The system components can, for example, be sensors, and the values of the data elements D can accordingly be telemetry data of these sensors.

The system according to the present teaching can also be used in the opposite direction, for example for remote maintenance, in that namely a communication device 13 as publisher feeds data into a channel, and these data are read out by the security controller 12, which then acts as subscriber. Depending on the application, the security controller 12 can then forward the data to the computer unit 4 and/or, if appropriate, directly to the installation components 8.

The values of the data elements D can either be made available to the authorized communication devices in their complete form via the broker 14, or they can be made available in a restricted form according to the requirements of the user 17. For example, it may therefore be necessary or required to display with a communication device whether the value of the data element D lies within certain parameters; at the same time, it can however be undesirable that the communication device 13 displays the exact value. In this case, a binary value (true/false), which is transmitted to the communication device 13 via a particular channel 15, can be produced, for example from the current value of the appropriate data element D based on the parameter condition. Information relating to the compliance of the particular parameters can then be displayed on the remote instance 2 of the communication device instead of the actual value. The display can also be in an animated or coded form, for example as a color code (e.g. true: green, false: red).

Figure 2:
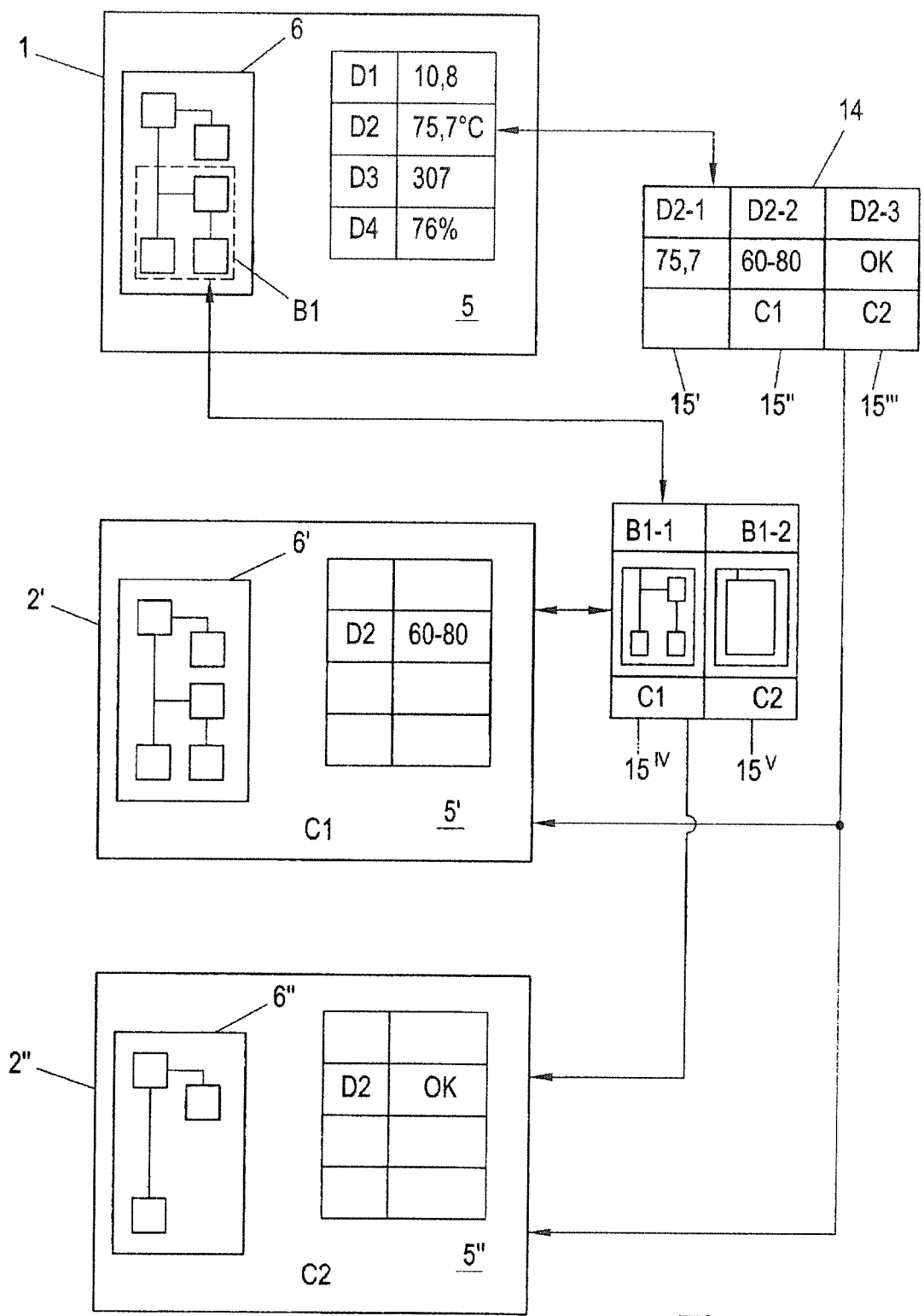
FIG. 2 illustrates by way of example how different authorizations can be used in the individual instances for a required different presentation.

FIG. 2 illustrates by way of example how different authorizations can be used in the individual instances for a required different presentation.

The screen view 1 of FIG. 2 has an image element 6 and a plurality of display positions for the values of the data elements D1 to D4, which are defined in accordance with a display schema 5. D1 is currently displaying a value of 10.8, D2 is showing 75.7 C°, D3 a value of 307, and D4 a value of 76% (these values are purely by way of example and are used only for illustration).

The image element 6 shown in the screen view 1, which could, for example, represent a simulation structure or a flow diagram, has an area which in this case is not defined as part of the display schema 5 but as an image data element B1 which represents a specific type of data element and therefore, like the other data elements D, is transmitted to the communication device via a second communication path.

The part of the image element 6 which is defined in the display schema 5 is then combined in the particular further instance $2^I$, $2^{II}$ with the currently transmitted image data element B1 in order to be able to display different image elements $6^I$, $6^{II}$ in the respective remote instances $2^I$, $2^{II}$. Depending on the type of image data element B1 transmitted, this therefore enables either the image element $6^I$ to be displayed on a remote instance $2^I$ with all details and/or in a dynamic presentation, or the image element $6^{II}$ can be displayed in another remote instance $2^{II}$ in a simplified, less detailed and/or static form. For an online meeting, for example, the user may need to display his current screen view 1 to each of the different meeting participants in a different degree of detail. For example, the remote instance $2^I$ of a first communication partner is to display a value for the data element D2 in a reduced resolution, and the image element 6 is to be displayed in its full degree of detail and, if appropriate, dynamically. On the other hand, the remote instance $2^{II}$ of a second communication partner is to show merely a status indication for the data element D2 (e.g. "OK" or "Fault"), and the image element 6 is only to be displayed here in reduced form. (A detailed description of the presentation of the other data elements D1, D3 and D4 has been dispensed with for the sake of clarity but can follow in a similar manner).

Three different channels $15^I$, $15^{II}$ and $15^{III}$, in which a value for the data element 2 is made available in a different degree of detail in each case, are defined in the broker 14 for the data element D2. The first channel $15^I$ makes the exact value available (D2-1), the second channel $15^{II}$ makes the value available in a lower resolution (D2-2) and the third channel $15^{III}$ makes only binary information relating to the status of the value available (D2-3).

A channel $15^{IV}$ for the image data element B1-1 in its detailed form and a second channel $15^V$ for the image data element B1-2 in its simplified form are likewise made available for the image data element B1.

The image data elements B can be made available via the same broker 14 as the data elements D; however, a plurality of brokers 14 can also be defined, which would define a plurality of second communication paths.

By setting the authorizations (which, as described above, can be carried out by means of keys C1, C2), the user can define exactly which content is presented in which form on each remote instance, wherein the presentation of the content in the remote instances $2^I$, $2^{II}$ is matched to the presentation of the screen view 1 in real time.

The invention claimed is:

1. A method for generating and updating a remote instance of a screen view for at least one communication device during a communication session, comprising:
    a number of data elements presented on the screen view in accordance with a defined static or dynamic display schema;
    a display schema that at least partially corresponds to the display schema of the screen view transmitted to the communication device at least a first time via at least one first communication path;
    values of at least one of the data elements transmitted to the communication device via at least one second communication path during the communication session;
    wherein the transmitted values of the data elements and the transmitted display schema are combined by the communication device in order to display the remote instance; and
    communication over the second communication path takes place via a broker and is executed in accordance with a protocol which functions in accordance with a subscriber/publisher model.

2. The method according to claim 1, wherein the screen view comprises a display of a computer unit which serves to control an installation of a user.

3. The method according to claim 1, wherein at least one of the number of data element represents data of the telemetry level.

4. The method according to claim 1, wherein data transmission over the second communication path is encrypted.

5. The method according to claim 1, wherein at least the second communication path defines a reverse channel.

6. An apparatus for making available a remote instance of a screen view for display on a communication device, comprising:
    wherein a computer unit on which the screen view is displayed, the computer unit having at least one first communication path and at least one second communication path to the communication device;

a number of data elements presented on the screen view in accordance with a defined static or dynamic display schema;

a display schema that at least partially corresponds to the display schema of the screen view transmitted by the computer to the communication device at least a first time via the first communication path;

values of at least one of the data elements transmitted to the communication device via the second communication path during a communication session;

wherein the computer unit accesses the first communication path via a network interface and accesses the second communication path via a security controller; and the security controller executes the communication via the second communication path according to a protocol which functions in accordance with a subscriber/publisher model.

7. The apparatus according to claim 6, wherein the second communication path feeds from the security controller via a broker.

8. The apparatus according to claim 6, wherein the security controller has an encryption and decryption unit.

9. The apparatus according to claim 6, wherein a plurality of instances of the data elements, depending on an authorization, are transmitted selectively to the communication device.

10. A software product embodied on a non-transitory computer medium which can be executed by a communication device for displaying a remote instance of a screen view displayed on a remote computer unit, comprising:

at least one first communication path and at least one second communication path connecting the communication device to the computer unit;

the software product enables the communication device to execute at least the following:

reception of a display schema that at least partially corresponds to a display schema of the screen view via the first communication path;

reception of values of data elements via the second communication path during a communication session is with a broker and in accordance with a protocol that functions with a subscriber/publisher model;

combination of the received display schema and received values of the data elements to form the remote instance of the screen view; and display of the remote instance.

11. The software product according to claim 10, wherein the software product further enables the communication device to transmit data values to the remote computer unit via the second communication path.

12. The software product according to claim 11, wherein the data values are entered by a user via a user interface of the communication device.

13. The method according to claim 1, wherein at least one data element of the number of data elements represents measured data from measuring sensors.

14. The method according to claim 1, wherein the transmitted display schema corresponds to a subset of the display schema of the screen view, based on authorization.

\* \* \* \* \*